Oct. 11, 1960 R. SOMMER 2,955,519
PHOTOGRAPHIC CAMERA
Filed June 5, 1958

INVENTOR
RICHARD SOMMER
BY
Blum, Moscovitz,
Friedman & Blum
ATTORNEYS.

United States Patent Office 2,955,519
Patented Oct. 11, 1960

2,955,519

PHOTOGRAPHIC CAMERA

Richard Sommer, Braunschweig, Germany, assignor to Voigtlander A.G., Braunschweig, Germany, a corporation of Germany Filed June 5, 1958, Ser. No. 740,105

2 Claims. (Cl. 95—64)

This invention relates to diaphragm opening adjusting means for photographic cameras and, more particularly, to diaphragm adjusting means of the type comprising two adjusting members each connected to the diahpragm, one of these members being also connected to the mechanism for adjusting the shutter exposure time. A specific feature of the invention is the provision of novel means associated with one of the diaphragm adjusting members for correlating the diaphragm opening adjustment with the film sensitivity.

It is one object of the present invention to provide an adjusting device which is as simple as possible in its operation and reading.

In carrying out this invention, a camera of the above mentioned type is provided with a structural unit composed of an objective mount and a shutter, and this structural unit comprises two adjusting rings for adjustment of the exposure values (time and diaphragm). One of these rings, which is the ring for adjustment of the shutter time, is coupled with one of the diaphragm adjusting members and carries two marks, one of which points to one side and extends along a scale of shutter time values, which is stationary relative to the camera, and the other of which points to the other side and extends along a scale of diaphragm values, this scale being arranged on the second adjusting ring which forms the adjusting means for the free adjusting member for the diaphragm. These two adjusting rings are preferably arranged in such a manner that—looking from the object to be photographed in the direction of the camera— the adjusting ring carrying the diaphragm scale is in front, and the shutter time adjusting ring carrying both marks is located behind it.

According to the invention, there is arranged, adjacent the adjusting ring which carries the diaphragm scale, an additional ring for adjustment of film sensitivity values, this ring having a knurled rim of a diameter substantially equal to that of such diaphragm adjusting ring. The two adjacent rings are arranged in such a manner that both rings can be gripped and displaced simultaneously. These two rings can be connected with each other by means of a releasable coupling, preferably a stop coupling, and may be adjustable relative to each other according to a scale of film sensitivity values. This arrangement is of particular advantage if the device for adjustment of time and diaphragm is connected with a mechanism by means of which a follow-up indicator is adjusted to the pointer deflection of an exposure meter built-in in the camera. The control member for such mechanism—which is preferably a cam ring—can then be connected with the ring for adjustment of film sensitivity values. If then, after release of the coupling, this adjusting ring of film sensitivity values, which controls the follow-up indicator mechanism, is adjusted relative to the adjacent adjusting ring connected with one of the diaphragm adjusting members, the follow-up indicator mechanism is given a fixed preliminary adjustment relative to the diahpragm, in conformity with the film sensitivity value.

The scale of light sensitivity values is preferably arranged in such a manner that, in the wall of the carrier for the diaphragm scale, a window-like recess is provided in which only the value, adjusted in each case, of the light sensitivity scale can be seen, said scale being arranged on a carrier connected with the adjusting ring for the film sensitivity values. This carrier can carry at the same time two scales, i.e. a scale calibrated according to DIN-values and a scale calibrated according to ASA-values, for each of which a reading window is provided in the wall of the carrier of the diahpragm scale in such a manner that, in one of the windows the DIN-value, and, in the other window, the corresponding ASA-value, can be read. At least one of these windows preferably is arranged near the diaphragm scale so that, upon looking at this latter scale, at the same time the adjusted film sensitivity value can be read.

An objective which is axially displaceably arranged for adjustment to distance, within this adjusting device for exposure values, is adjustable preferably by means of an adjusting ring which—viewed in the direction from the object to be photographed to the camera—is arranged in front of the adjusting rings for the exposure values and carries at the same time a distance scale which can be read relative to a stationary mark. On both sides of this stationary mark a depth of field scale, which cooperates with the distance scale, can be arranged.

The appended drawings illustrate, by way of example, specific embodiments of and best modes for carrying out the invention, to which the invention is not limited.

Figure 1:
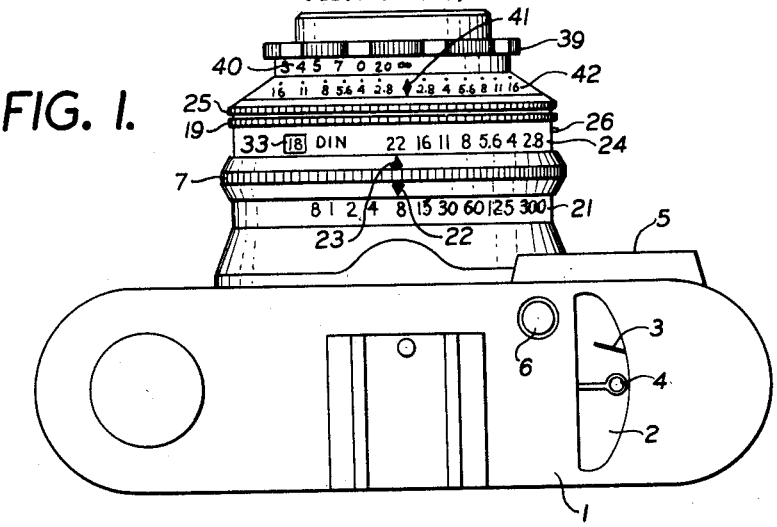
Figure 1 is the top plan view of a photographic camera.

Referring now to the drawings in detail, in Fig. 1 reference symbol 1 denotes the casing of a photographic camera. In the cap of this camera, a window 2 is provided, through which the pointer 3 of an electric exposure meter and an indicator or mark 4 of a follow-up mark mechanism, which is adjustable to the deflections of said pointer, can be seen. The follow-up mark 4 is coupled with the exposure value adjusting device of the camera in such a manner that, when the mark is in superposition with pointer 3, the resulting adjustment of diaphragm and shutter time value, with consideration of the adjusted value of film sensitivity, will correspond to the illumination conditions of the object to be photographed. The light-sensitive cell of the exposure meter is denoted 5 and the shutter release key 6.

Figure 2:
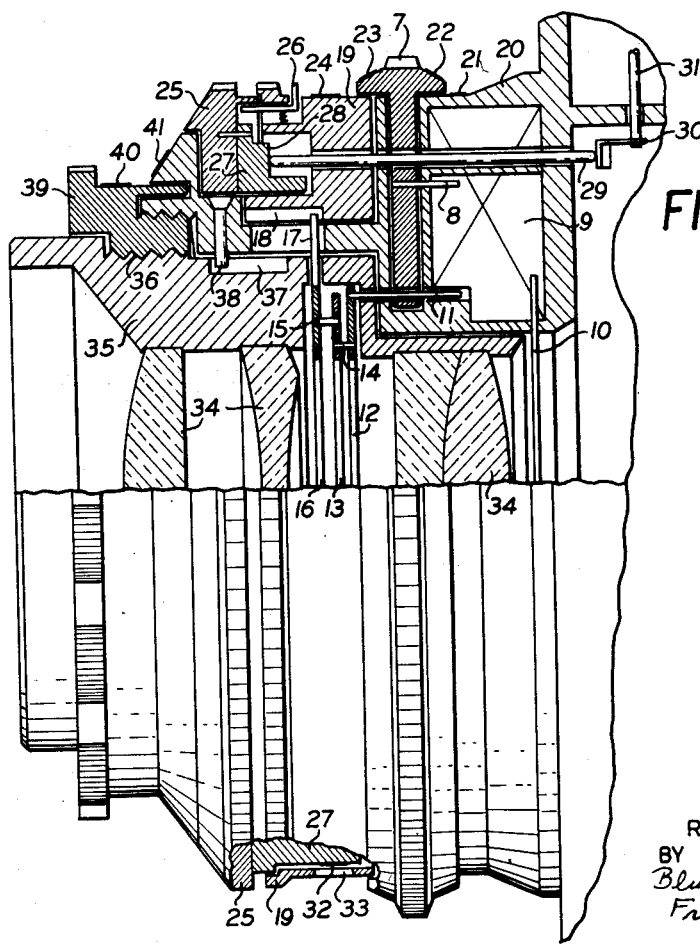
Figure 2 illustrates a structural unit consisting of the objective mount and the shutter of this camera, in side elevation view partially in axial section, and on an enlarged scale in comparison with Fig. 1.

The adjusting means for moving the follow-up mark 4 are seated on the structural unit formed by the shutter and the objective mount. Reference symbol 7 denotes a knurled shutter time adjusting ring which—as shown in Fig. 2—is connected, over a member 8, with mechanism 9 for moving shutter sectors 10. The shutter time adjusting ring 7 is engaged by a coupling pin 11, which is seated in a diaphragm adjuster 12. This diaphragm adjuster 12 is a ring provided with control notches, each of which is engaged by a control pin fastened to a diaphragm lamella. For the sake of clarity, only one diaphrgram lamella 13 and its control pin 14 are shown in the drawing. By its bearing pin 15, this lamella 13 rests in a likewise ring-shaped diaphragm adjuster 16, which—by means of its attached flap 17— engages a longitudinal groove 18 of a diaphragm adjusting ring 19. Thus, the diaphragm lamellae 13 will be displaced upon turning the shutter time adjusting ring 7, as well as upon operation of diaphragm adjusting ring 19. The arrangement is made in such a manner that, upon displacement of the shutter time adjusting ring 7 from one shutter time value to the next value (which is a time value of either double length or half length), the diaphragm is opened, or closed, by one diaphragm step. Therefore, during this adjustment merely the shutter time value-diaphragm value combination is changed, while the exposure value remains unchanged.

Adjustment of the shutter time adjusting ring 7 is carried out with reference to a stationary shutter time scale 21 arranged on mount body 20 and a time mark 22, which latter moves along said scale and is arranged on shutter time adjusting ring 7. Opposite time mark 22, a diaphragm mark 23 is arranged on ring 7 and points to a diaphragm scale 24 located on diaphragm adjusting ring 19. The marks 22 and 23 can be combined to a single marking line.

Upon adjustment of diaphragm adjusting ring 19, diaphragm scale 24 moves along diaphragm mark 23, which remains stationary, whereby—through diaphragm adjuster 16—the diaphragm is also adjusted to the value indicated in the respective case. If the shutter time adjusting ring 7 is displaced, diaphragm adjuster 12, connected thereto by coupling pin 11, will likewise move. The diaphragm value adjusted in this manner is indicated by diaphragm mark 23, which then moves along diaphragm scale 24, which is now stationary.

Directly beside the diaphragm adjusting ring 19, an adjusting ring 25 has an outer diameter substantially arranged, the knurled rim of which is equal to that of diaphragm adjusting ring 19 and which is so near to the latter that both knurled rims can be gripped and displaced at the same time. Moreover, the two adjusting rings 19 and 25 are connected with each other by means of a releasable coupling. This coupling is formed by a coupling latch 26, which is seated in diaphragm adjusting ring 19 and engages, under spring effect, the teeth of adjusting ring 25. In this manner, ring 25 can be arrested in various positions, determined by the division of the stops, relative to the diaphragm adjusting ring 19.

Fixedly connected with adjusting ring 25 is a control ring 27. This ring carries a control cam 28, which extends in axial direction. A control pin 29, which is axially displaceably arranged in mount body 20 and passes through openings of diaphragm adjusting ring 19 and shutter time adjusting ring 7, engages said control cam 28. The other end of control pin 29 is in contact with a lever 30, which is fastened to a shaft 31 arranged in camera body 1. This shaft 31 moves—due to the turning movement imparted to it—follow-up mark 4, over intermediate members not shown.

As shown in the lower half of Figure 2, control cam 28 extends relative to diaphragm adjusting ring 19 in such a manner that a scale 32 of film sensitivity values, applied to the outer peripheral surface of control ring 27, can be read through a window 33 provided in diaphragm adjusting ring 19. The size of this window 33 permits reading of only a single value of scale 32 at a time. Control cam 28 can carry two scales 32, one of which in calibrated e.g. in DIN-values and the other in ASA-values. In this case, a particular window is coordinated to each scale so that, in one window, the DIN value and, in the other, the corresponding ASA value, is indicated.

Part 35 of the objective mount body, which carries the diaphragm and lenses 34 of the picture taking objective, is axially displaceably arranged in an adjusting thread 36 in mount body 20 and is prevented from turning relative to the latter by a pin 38 which engages a longitudinal groove 37. Axial displacement is effected by turning distance adjusting ring 39, the distance scale 40 of which extends relative to a mark 41 arranged on the fixed mount body 20. On both sides of this mark 41, a conventional scale of depth of field 42 extends, as best seen in Fig. 1.

The scale 42 of depth of field extends equally to both sides from mark 41 and is calibrated in diaphragm adjusting values. It is known that the range of depth of field is determined by the adjusted diaphragm value and it can be read by reference to scale 42, on the distance scale 40. The depth of field corresponds to that range of the distance scale, which is located opposite the range between the two values of scale 42, which correspond to the adjusted diaphragm value.

The above described adjusting device operates as follows.

After releasing coupling 26, first the diaphragm adjusting ring 19 and setting ring 25 are adjusted, by disengaging coupling 26 and turning these rings relative to each other, to the sensitivity value of the film inserted in the camera. When this value of scale 32 appears in window 33, by engaging coupling member 26, a fixed connection between rings 19 and 25 is established. Control ring 27, and thus follow-up mark 4, which is moved by it, have a definite fixed position relative to the diaphragm.

Prior to taking a picture, the light-sensitive cell 5 is exposed to the light coming from the scene of picture taking, whereby pointer 3 of the exposure meter will show a corresponding deflection. By turning ring 25 and diaphragm adjusting ring 19 coupled therewith, follow-up mark 4 is brought to superposition with pointer 3. By the then occurring rotation of diaphragm adjuster 16, the diaphragm is adjusted to a value, which—in combination with the shutter time value adjusted in the respective case—yields the correct exposure value for the contemplated picture taking. If the so adjusted combination of diaphragm value and shutter time value is not suitable for the contemplated photographic picture, by turning shutter time adjusting ring 7 another, more suitable, time-value, can be adjusted. As already mentioned above, in diaphragm-combination within the adjusted exposure such displacement, in changing the shutter time value, the diaphragm is likewise displaced in conformity with the exposure value, over diaphragm adjuster 12, whereby the other diaphragm adjuster 16 and follow-up mark 4 do not move.

By the above described and illustrated coupling of the two diaphragm adjusters 12 and 16 with their adjusting rings 7 and 19, i.e. by diaphragm adjuster 16 having its flap 17 engaged in groove 18 of diaphragm adjusting ring 19, and coupling pin 11 of diaphragm adjuster 12 displaceably engaging time adjusting ring 7, it is possible that—in adjusting the objective to distance—the diaphragm can be axially displaced relative to its non-axially displaceable adjusting rings.

The above described adjusting device is simple in operation and permits observation of adjusted values clearly and in well-defined manner.

It will be understood that this invention is not limited to the specific elements, designs, arrangements and other details specifically described above and illustrated in the drawings and can be carried out with various modifications without departing from the scope of the invention as defined in the appended claims.

The sensibility of films is expressed in figures in various systems of measurement. The example of this invention mentions the application of the two systems mostly used—DIN and ASA. The DIN values correspond to the German, the ASA values to the American norm of sensibility. The scales and corresponding counter windows for setting of the sensibility are arranged in such form, permitting the setting of corresponding sensibilities in both windows, i.e. if the DIN scale shows "18," the ASA scale shows "50."

What is claimed is:

1. A photographic camera comprising, in combination, an objective; an objective mount therefor; a shutter formed as a structural unit with said objective mount; an iris diaphragm, having movable lamellae, disposed in the path of light rays passing through said objective; first and second co-axially arranged setting rings; said lamellae being pivotally connected to both of said setting rings; a shutter time adjusting ring non-rotatably coupled to said first setting ring; an exposure value adjusting ring arranged coaxially with said shutter time adjusting ring and non-rotatably coupled to said second setting ring; a stationary shutter time scale arranged on said objective mount and extending along one side of said shutter time adjusting ring; a diaphragm opening scale extending along said exposure value adjusting ring adjacent the other side of said shutter time adjusting ring; a pair of indicating marks on said shutter time adjusting ring respectively associated with said scales; a film sensitivity value adjusting ring arranged coaxially with and adjacent said exposure value adjusting ring; said exposure value adjusting ring and said film sensitivity value adjusting ring having knurled rims substantially equal in diameter and design; teeth extending around the inner peripheral surface of one of said exposure value adjusting ring and said film sensitivity value adjusting ring; a coupling latch movably mounted on the other of said exposure value adjusting ring and said film sensitivity value adjusting ring; a spring biasing said coupling latch to engage said teeth; a control ring coaxial with and non-rotatably coupled to said film sensitivity value adjusting ring, said control ring extending in substantially telescoped relation into said exposure value adjusting ring; a pair of scales arranged on the outer surface of said control ring within said exposure value adjusting ring, said scales being arranged in consecutive relation and one scale being calibrated in DIN values and the other in ASA values of film sensitivity; and a pair of window openings formed in said exposure value adjusting rings and each coordinated with a respective one of said scales of film sensitivity; said window openings being coordinated with said scales in such a manner that, in one of the windows, the adjusted value of one of the scales, and in the other window, the corresponding adjusted value of the other scale, will be visible.

2. A photographic camera as claimed in claim 1 including a mount member axially displaceably mounted in said objective mount; said lenses and said setting rings for the iris diaphragm being mounted in said mount member in longitudinally fixed relation thereto; a distance adjusting ring rotatably mounted on said objective mount, said mount member being threadedly engaged with said distance adjusting ring; a pin fixedly mounted in said objective mount and slidably engaging a longitudinal groove formed in said mount member to restrain the latter against rotation relatively to said objective mount; a distance scale arranged around said adjusting ring; a stationary indicator mark arranged on the objective mount adjacent said distance scale and co-operable therewith; and a depth of field scale extending in both directions from said indicator mark and co-operable with said distance scale.

References Cited in the file of this patent

UNITED STATES PATENTS

| | | |
|---|---|---|
| 2,053,089 | Kuppenbender | Sept. 1, 1936 |
| 2,467,946 | Rossmann et al. | Apr. 19, 1949 |
| 2,596,328 | Dorsey | May 13, 1952 |
| 2,612,091 | Weiss | Sept. 30, 1952 |
| 2,849,936 | Fahlenberg | Sept. 2, 1958 |